May 17, 1966 L. C. SOUDER ETAL 3,251,904
HIGH IMPACT RESISTANT POLYMERIC PRODUCTS DERIVED FROM
ALKYL ACRYLATE-ALKYL METHACRYLATE COPOLYMERS BLENDED
WITH POLYVINYL CHLORIDE AND THE LIKE
Filed Nov. 3, 1961 4 Sheets-Sheet 1

INVENTORS: LOUIS C. SOUDER
BJORN E. LARSSON

May 17, 1966

L. C. SOUDER ETAL 3,251,904

HIGH IMPACT RESISTANT POLYMERIC PRODUCTS DERIVED FROM
ALKYL ACRYLATE-ALKYL METHACRYLATE COPOLYMERS BLENDED
WITH POLYVINYL CHLORIDE AND THE LIKE

Filed Nov. 3, 1961

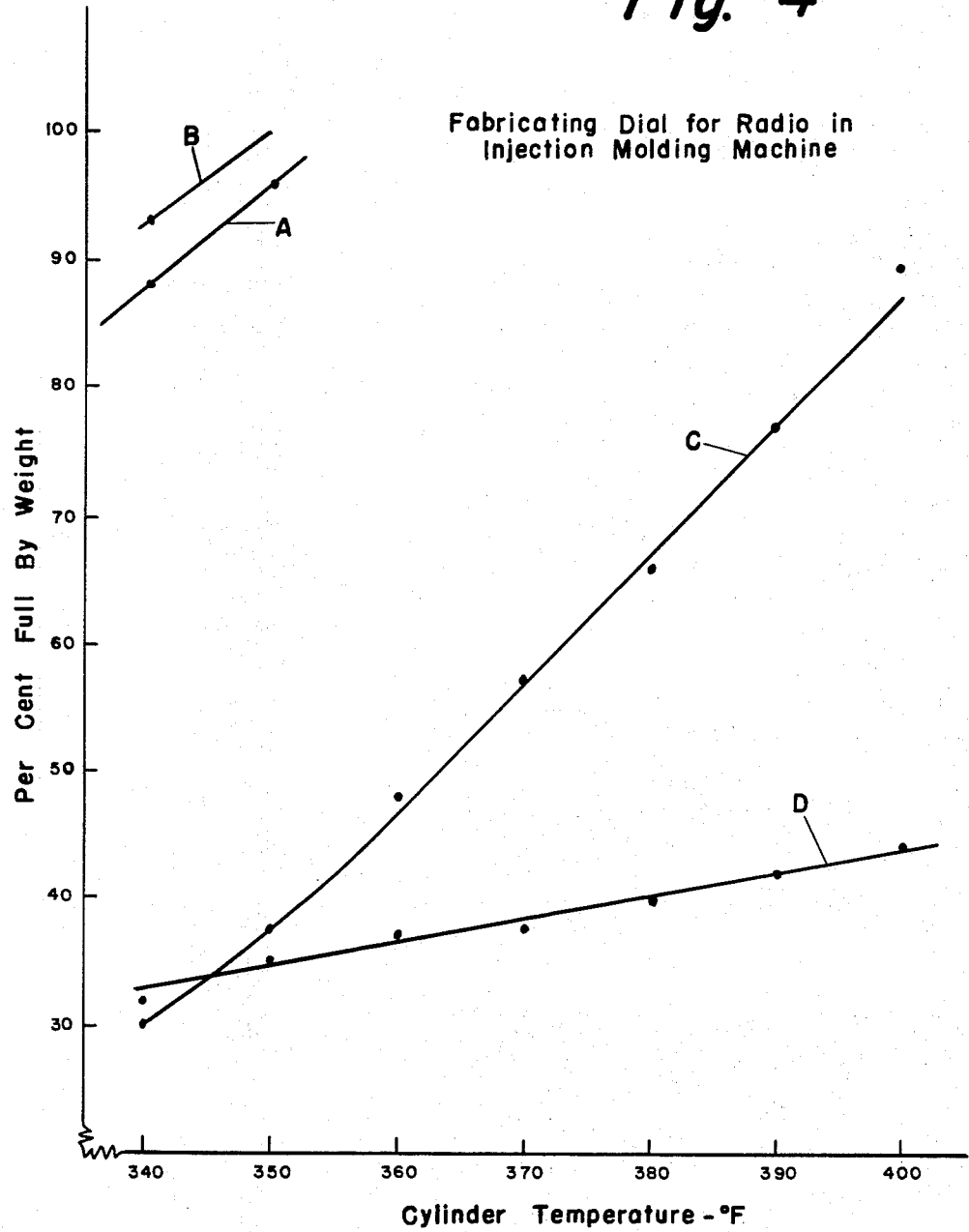

3,251,904
HIGH IMPACT RESISTANT POLYMERIC PRODUCTS DERIVED FROM ALKYL ACRYLATE-ALKYL METHACRYLATE COPOLYMERS BLENDED WITH POLYVINYL CHLORIDE AND THE LIKE

Louis C. Souder, Levittown, Pa., and Bjorn E. Larsson, Moorestown, N.J., assignors to Rohm & Haas Company, Philadelphia, Pa., a corporation of Delaware
Filed Nov. 3, 1961, Ser. No. 150,038
6 Claims. (Cl. 260—876)

This application is a continuation in part of our application Serial Number 12,904, which was filed on March 7, 1960, and which has since been abandoned.

This invention relates to solid, thermoplastic, polymeric products resulting from the polymerization of alkyl methacrylates with polyalkyl acrylates. It also relates to high impact resistant materials which result from blends of such products with other polymeric materials. Examples of such polymeric materials which can be used in the blends are polyvinyl halides, particularly polyvinyl chloride, and copolymers of at least 80% by weight of a polyvinyl halide with up to 20% by weight of another monovinylidene compound copolymerizable therewith, such as vinyl acetate, methyl methacrylate, styrene, or the like.

The new polymeric products of this invention may be prepared by polymerizing an alkyl methacrylate with a polymerized alkyl acrylate. Preferably, alkyl ($C_1$ to $C_8$) acrylates and lower alkyl ($C_1$ to $C_4$) methacrylates are used. Blends thereof with other polymeric materials may be prepared by admixing, such as by utilizing a roller mill, Banbury mixer or extruder. If desired, the various blends may be pelletized prior to their use in further forming operations. Heretofore, in the blending of polymeric products with polyvinyl chloride and the like to make impact-resistant materials, the art has resorted to polymers which contain rubber or rubber-like materials such as polymers or copolymers of butadiene. One of the drawbacks to the use of such materials has been the fact that they tended toward oxidative degradation and light instability, becoming discolored on exposure to light. These faults were due to the fact that the materials are largely unsaturated compounds. By contrast, the polymers which are formed by the present invention have no substantial concentration of points of unsaturation. They therefore possess far greater resistance to oxidation and are considerably more stable to light, while at the same time making possible significantly improved impact-resistant properties when they are blended with polyvinyl chloride. What is more, the impact resistance is retained throughout the essential lifetime of the end product.

Critical to the success of the present invention is the fact that the polymers of alkyl methacrylate and alkyl acrylate are formed from certain prescribed percentages of each. When properly so formulated, these polymers are capable of providing a tremendously increased resistance to impact when they are blended with polyvinyl chloride, as will be demonstrated below.

Another important improvement over the modified or unmodified polyvinyl thermoplastic material of the prior art which the present invention has made possible is the tremendously improved flow properties of the blends which are used to form products by molding under pressure and elevated temperatures, such as by injection molding. Considerable difficulty has been experienced in the past with the inability to make some thermoplastic compositions flow properly so as to fill the entire mold in which certain end products are made. To overcome these difficulties, the normal expediencies are to increase the pressure and/or increase the temperature under which the injection molding takes place.

However, there are several problems when resorting to either of these means; one is that there is a limit to the amount of pressure which may be applied, and this is a factor of the machines employed; another is that when temperatures become too high, there is bound to be decomposition or other adverse effects upon the plastic product.

Unmodified polyvinyl chloride compositions have two inherent limitations. One is their relatively poor flow properties at temperatures which contribute adequate flow to plastics based on polystyrene, polymethyl-methacrylate, polyethylene, etc. Another is the thermal instability of polyvinyl chloride at the high temperatures which might be expected to give good flow properties. As a consequence, if the polyvinyl chloride composition does not flow freely so that higher and higher pressures must be resorted to, it may be necessary to build relatively huge machines in order to be able to develop sufficient pressure to mold the plastic to a desired end configuration. This certainly is undesirable. As for increases in temperature, apart from the inefficiency which results from the necessity to develop the higher energy requirements and the machinery to contain same, resorting to such conditions invariably leads to an end product whose surface finish is rather poor. Even more likely is the possibility that the high heat will cause a burnt or scorched appearance in the end product.

The polymeric methacrylate-acrylate products of the present invention, when blended with polyvinyl chloride as herein disclosed, make possible the injection molding of very difficult patterns with greater ease than has ever before been possible with polyvinyl chloride blends. Because of this it has become possible to avoid having to resort to the excessive pressures and temperatures which so adversely affect the plastic end product. Thus, as will be demonstrated below and by reference to the attached drawings, it is now possible to make molded plastic products that heretofore have defied injection molding techniques. In particular, it is possible to provide thermoplastic vinyl halide products which possess excellent physical properties, including high impact strength and shock resistance.

The improved moldability of the thermoplastic compositions of the present invention can well be appreciated by reference to the drawings wherein:

FIGURE 1 is a front plan view of a dial for a portable radio, the entire outer outline (indicated by the letters A and B) representing the fully molded product which is made by the present invention, while the lines indicated by letters C and D represent segments of the entire mold which were the maximum size products that could be made under the same conditions with thermoplastic compositions of the prior art.

FIGURE 4 is a graph showing the effect of increases in temperature when making the dial for a radio cabinet as shown in FIGURE 1.

Figure 1:
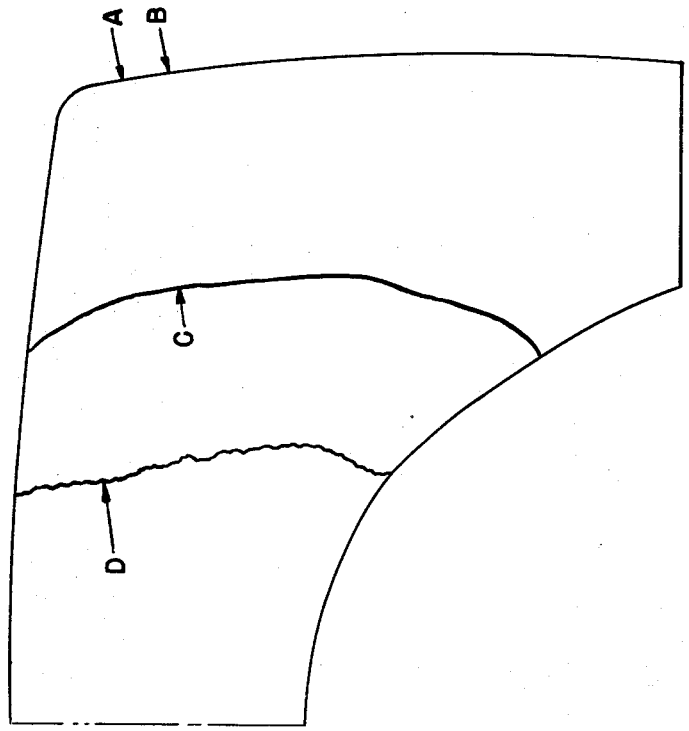
Figure 1:
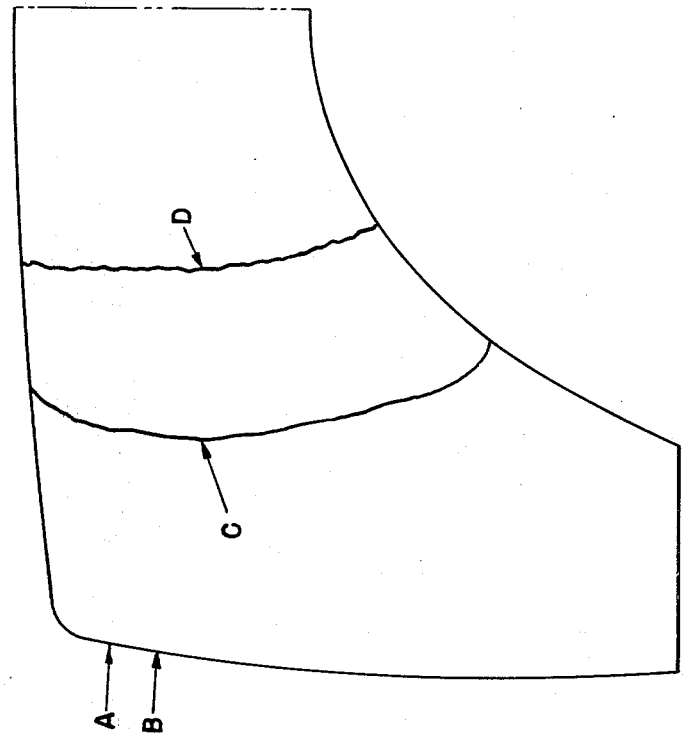

Referring now to the acrylate-methacrylate copolymer, the alkyl acrylate component is polymerized alkyl acrylate in which the alkyl groups contain from one to eight carbon atoms, or copolymers of at least 80% of a said alkyl acrylate with other monomers which are copolymerizable therewith, and which have a single vinylidene group ($CH_2=C<$) as the sole polymerizably reactive group, such as alkyl methacrylic esters, acrylic and methacrylic acids and nitriles, vinyl halides, vinyl esters, styrene, vinyl toluene, and the like.

The alkyl methacrylate component of the polymeric product is one which has from one to four carbon atoms in the alkyl group, or a mixture of monomers containing at least 80% of a said $C_1$-$C_4$ alkyl methacrylate with other monomers copolymerizable therewith having a single vinylidene group as the sole polymerizable reactive group, such as alkyl acrylates, acrylic and methacrylic acids and nitriles, vinyl halides, vinyl esters, styrene, vinyl toluene, and the like. The ratio of the alkyl acrylate component to the alkyl methacrylate component in said products is within the range of 75 to 40 parts by weight of the former, to 25 to 60 parts by weight of the latter.

In preparing the blends with polyvinyl chloride, and the like, the acrylate-methacrylate copolymer is blended in an amount of from 5 to 40 parts by weight, with 95 to 60 parts by weight of the polyvinyl halide or equivalent material. The amounts of such new polymeric products which are blended with the polyvinyl halide materials will depend upon the nature of the prepolymeric backbone of such products, as well as the nature of the properties to be attained in the ultimate blend. For example, when the backbone of the product is an acrylate having two carbon atoms in the alkyl group, optimum impact strength of the product may require use in the blend of an amount on the order of 15–45% by weight, whereas when the acrylate is one wherein the alkyl group contains eight carbons, the development of optimum impact strength may require amounts on the order of 5–25% by weight.

The blended compositions are tough, rigid, thermoplastic, chemically resistant materials having high impact strength and high heat distortion temperatures. They are particularly useful in forming plastic pipe and extruded products of similar nature, as well as for forming other plastic products such as by molding, calendering, and the like.

Referring now to the drawings, it will be seen that each of them contains reference characters A, B, C, and D. These letters refer to compositions or products made by blending polyvinyl chloride with those compositions as follows:

A and B pertain to compositions made in accordance with the present invention. C identifies a composition of the type disclosed in U.S. Patent 2,943,074. D refers to a composition of the type disclosed in U.S. Patent 2,808,387. Until now, compositions C and D have universally been accepted as among the best vinyl halide polymeric thermoplastic materials for molding, from which relatively high impact properties in the end product could be obtained.

Referring to FIGURE 1, the radio dial there shown was fabricated by conventional injection molding techniques using a Model L–2–4B Lester machine, and applying approximately 20,000 pounds per square inch of pressure at 360° F. cylinder temperature (i.e. the temperature of the chamber in which the plastic is fused). The injection point was exactly mid-way between the left and right extremities and the bottom and top of the central arch of the mold. The mold itself was approximately 80–90 mils thick, 12.6 inches wide, and 4.8 inches high at its maximum extremities. The drawing shows the mold to actual dimensions except where it was broken in the middle in order to get all of it on one page. To anyone skilled in the injection molding art, the difficulty of forming such an end product from a molding powder composed predominantly of polyvinyl chloride can well be appreciated.

As the letters A and B in FIGURE 1 indicate, the compositions of the present invention flowed freely to fill the entire mold so that perfect end products were obtained thereby. The letter C indicates that the compositions of that prior art type only partially filled the mold and were obviously unsatisfactory. The letter D indicates that compositions of that prior art type flowed even more poorly and resulted in edges which were quite ragged; it obviously was the poorest of all the four that were tested.

Figure 2:
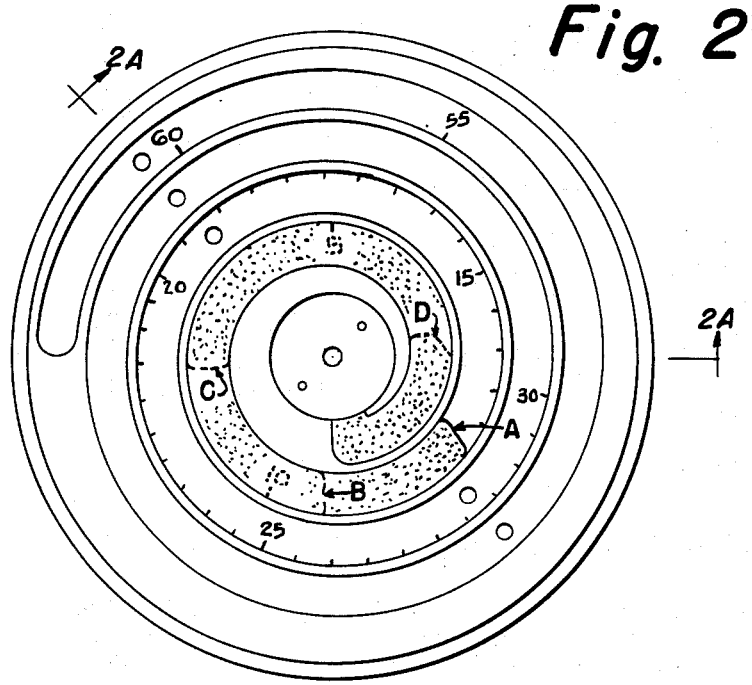
FIGURE 2 is a top plan view of an Archimedes spiral test mold which is employed to test the flowing characteristics of thermoplastic compositions, and shows the comparative extent of flow of two molding which were made from prior art thermoplastic compositions, as well as two that were made in accordance with the present invention.
Figure 2A:
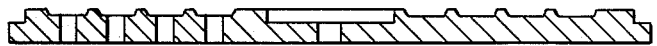

Referring now to FIGURE 2, we see a spiral-cavity mold which follows the well-known Archimedean spiral that has been used for studying the flow of thermoplastics during injection molding. An article which is generally descriptive of this technique is "Spiral-Flow Molding" by L. Griffiths, Modern Plastics, volume 30, Number 12, August 1957, page 111. By this well-known technique, it is possible to measure and compare the relative flow properties of different thermoplastic materials. The plastic is injected into the exact center of the spiral and is made to flow through the cavity whose cross-section is illustrated in FIGURE 2–A.

When the hot, molten plastic is injected into the cold spiral mold, it starts to solidify. The extent to which the plastic will flow to fill the spiral cavity is a measure of the flow properties or moldability of the plastic composition. In FIGURE 2–A, there is shown, occupying a part of the test mold, an actual plastic molding which was made by injecting the thermoplastic composition by means of a Lester injection molding machine, Model L–2–4B, using an injection pressure of approximately 19,300 lbs./in.$^2$, and a temperature of approximately 365° F. The letter A in FIGURE 2 points to the end of the maximum length of the spiral end product which was attained. This was accomplished by one of the compositions of the present invention. The letter B, which represents another composition of the present invention, represents the length or extremity of the spiral end product which was made in a similar fashion. Likewise, the letter C represents a composition of the prior art as described previously, and it will be noted that it flowed to a much shorter distance than did either compositions A or B. The letter D, also representing a composition of the prior art as described above, was the poorest of all in that it flowed a short distance and thus formed a very small piece of the spiral as shown.

The test mold, it will be noted, is subdivided by lines into ½ inch markings along the path of the spiral cavity, and is marked off by numerals at intervals of 5 inches. Using these numerical graduations, it will be seen that composition A formed a spiral end product of about 12½ inches; composition B a product of about 10½ inches; composition C a product of approximately 7 inches; and composition D a product of less than 2 inches.

In a similar way ten test spiral moldings were made at each of a number of increasing temperatures of the cylinder in which the plastic is converted to its molten state. The initial temperature was 320° F., the second and third series of ten moldings were run at 330 and 340° F. respectively. Thereafter, each set of ten moldings was made at temperature increments of 5° F. The results of these tests can be seen in Table I which follows:

TABLE I

*Spiral flow moldings of vinyl chloride in L2–4B Lester machine*

FLOW INCHES [1]

| Temp. (° F.) | A | B | C | D |
|---|---|---|---|---|
| 320 | 8.9 | 6.3 | 1.3 | 3.0 |
| 330 | 9.8 | 7.1 | 2.3 | 3.3 |
| 340 | 10.8 | 8.1 | 3.7 | 3.5D |
| 345 | 11.3 | 8.5 | 4.4 | 3.2 |
| 350 | 11.6 | 9.1 | 5.3 | 3.0 |
| 355 | 11.8 | 9.6 | 5.6 | 2.6 |
| 360 | 12.2 | 10.0 | 6.2 | 2.5 |
| 365 | 12.5 | 10.5 | 6.8D | 2.3 |
| 370 | 13.1 | 11.2 | 7.3 | 2.1 |
| 375 | 13.6D | 11.9 | 7.6 | 1.7 |

[1] The indicated results represent average values for the last five moldings of each set of ten.
D indicates decomposition.

In a like manner, seven test molds were made of the radio dial illustrated in FIG. 1. In these tests the first mold was made at 340° F. and each consecutive one was made with temperature increments of 10° F. The results of these tests can be seen in Table II which follows:

TABLE II

*Radio dial moldings of vinyl chloride in L–2–4B Lester machine*

PERCENT FULL BY WEIGHT

| Temp. (° F.) | A | B | C | D |
|---|---|---|---|---|
| 340 | 88 | 93 | 30 | 32 |
| 350 | 96 | 100 | 38 | 35 |
| 360 | 100 | 100 | 48 | 37 |
| 370 | 100 | 100 | 57 | 38 |
| 380 | 100 | 100 | 66D | 40D |
| 390 | 100D | 100D | 77 | 42 |
| 400 | 100 | 100 | 90 | 44 |

D indicates first point of discoloration.

The data in both Tables I and II were under conditions whereby the injection pressure was maintained relatively constant at approximately 19,300 lbs./sq. in.

Figure 3:
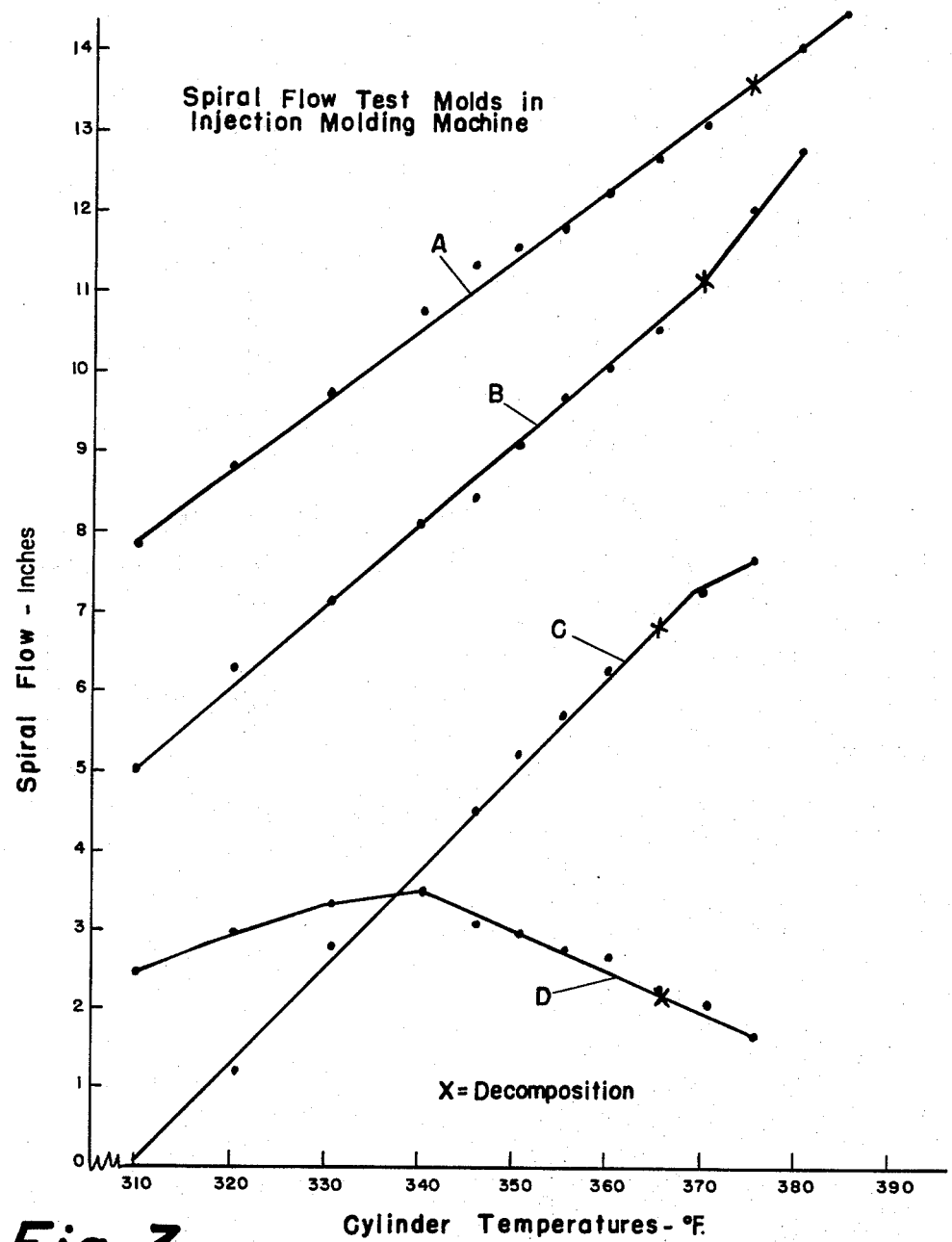
FIGURE 3 is a graph which shows the effect of increasing temperatures when making the type of spiral test molding which is shown in FIGURE 2.

A further appreciation of the advance in the art which the present improvements have made possible can be obtained by referring to FIGS. 3 and 4 which graphically depict the data in Tables I and II. In FIG. 3, which corresponds to Table I, there is shown a comparison of spiral flow test mold results as the temperatures of the molten plastic are raised from 310° to over 375° F. Here, it can be seen that compositions A and B of the present invention result in much longer spiral test molds than can be obtained with compositions C and D of the prior art. As the temperatures are raised, thereby making the plastic more fluid, it will be seen that the length or distance of flow is increased from 5 to 12 inches in the case of composition B and from 8 to 14 inches in the case of composition A. By contrast, composition C shows an increase from 0 to 7 inches, and composition D, which shows an increase from 2.5 to 3 inches, actually then shows a decrease down to less than 2 inches.

In FIG. 4, which corresponds to Table II, there are illustrated the results obtained when increasing the temperature from 340° to 400° F. in the fabrication of the radio dial. Here, it can be seen that compositions A and B of the present invention resulted in 100% full moldings at temperatures of about 360° F., whereas at that temperature the prior art compositions C and D were less than 40% full. Moreover, compositions C and D could not even produce a full radio dial moulding when the temperatures were raised to 400° F. In this graph, it will be noted that full flow, or any portion less than full flow, is represented in terms of the weight percent of the molded end product. Thus, the product made from composition C, which showed a weight percent of less than 50 at a temperature of 360° F., could not provide an end product with as much as 90 weight percent when the temperature was raised to almost 400° F. Likewise, composition D, which showed a weight percent of about 35 at 360° F., did not go much over 40 percent when the temperature was increased.

The improvements in the state of the art are clearly indicated by the data in Tables I and II and in the accompanying drawings. As must be evident by the above comparisons of the compositions of the present invention and of the prior art compositions, the highly significant improvements which have been obtained are obviously due to the nature of the acrylate-methacrylate polymer, the critical proportions thereof, as well as the nature and critical proportions of the blend which results when those copolymers are mixed with polyvinyl halide or the like in the preparation of the thermoplastic molding compositions.

Additional series of spiral test molds and of the molds for the radio dial were made as shown in Tables III and IV, respectively.

TABLE III

*Appearance of spiral test molds*

| Sample | Temp. (° F.) | Composition | | | |
|---|---|---|---|---|---|
| | | A | B | C | D |
| 1 | 400 | Surface decomposition (15,250 p.s.i.). | Surface decomposition (15,000 p.s.i.). | Decomposition (19,000 p.s.i.). | Decomposition (19,000 p.s.i.). |
| 2 | 390 | No defects (16,000 p.s.i.) | Surface decomposition (15,600 p.s.i.). | do | Do. |
| 3 | 380 | No defects (16,400 p.s.i.) | No defects (16,400 p.s.i.) | do | Mottled surface (19,000 p.s.i.). |
| 4 | 370 | No defects (16,800 p.s.i.) | No defects (17,400 p.s.i.) | No defects (19,000 p.s.i.) | Surface imperfections (19,000 p.s.i.). |
| 5 | [1] 360 | No defects (18,000 p.s.i.) | No defects (19,000 p.s.i.) | do | Do. |
| 6 | 350 | No defects (19,300 p.s.i.) | do | do | Do. |
| 7 | 340 | do | do | do | Do. |

[1] Composition D was tested at 366° F.

In Table III, it will be seen that the spiral test molds were made at temperatures of 340–400° F. The injection pressure was approximately 19,000 p.s.i. when the temperature was 340° F. and was reduced to 15,000 p.s.i. as the temperature was increased. It can be seen that the products made from compositions A and B of the present invention showed practically no defects, even when the temperature was raised to 390° F. Under such conditions, moreover, it was possible to lower the injection molding pressure by about 3000 p.s.i. By contrast, the products made from compositions C and D showed surface defects or decomposition when the temperatures reached 370° F. in one case and 380° F. in the other. In this situation it is obvious that no decrease in pressure was possible.

TABLE IV

*Appearance of moldings for radio dial*

| Sample | Temp. (° F.) | Composition | | | |
|---|---|---|---|---|---|
| | | A | B | C | D |
| 1 | 340 | 100% full flow; no decomposition; very high gloss; very smooth surface. | 100% full flow; no decomposition; very high gloss; very smooth surface. | From 30% to 90% full flow; semiglossy; smooth but with scuff marks. | From 30% to 45% full flow; no gloss; rough; surface cracks. |
| 2 | 355 | do | do | do | Do. |
| 3 | 360 | do | do | do | Do. |
| 4 | 370 | do | do | do | Decomposition. |
| 5 | 380 | do | do | Decomposition | Do. |
| 6 | 390 | Surface decomposition | Surface decomposition | do | Do. |
| 7 | 400 | do | do | do | Do. |

NOTE.—Pressure was uniformly maintained at 19,300 p.s.i.

From Table IV it will be seen that the radio dial molds were made at temperatures of between 340 and 400° F. The pressures were uniformly maintained at about 19,300 p.s.i. In the case of compositions A and B of the present invention, not only was 100% full flow obtained at temperatures of at least 360° F., as reported above, but there was no discoloration and the surfaces were both very smooth and with a very high gloss, even though the temperatures were raised to 380° F. By contrast, the prior art compositions C and D both (1) failed to give full flow by a considerable margin; (2) resulted in an end product which had practically no gloss and whose surface may be marred by scuff marks; and (3) could not be molded above 370° F., for they decomposed as they approached 380° F.

The unique copolymers, which are blended with polyvinyl halides and the like to make the novel high impact resistant materials, may be made by a number of ways such as by emulsion, suspension or bulk polymerization techniques. The following examples will illustrate the preparation of those new polymeric products which are within the scope of this invention.

EXAMPLE 1

One part of sodium lauryl sulfate and 400 parts of water were mixed and heated to 80° C. under nitrogen with stirring. 0.25 part of potassium persulfate was added. One hundred parts of 2-ethylhexyl acrylate was then added gradually over a thirty minute period to the solution maintained at 80–90° C. Polymerization of the monomer was virtually complete a few minutes after the addition. Thirty minutes later 100 parts of methyl methacrylate was added over a period of thirty minutes during which the temperature of the emulsion was maintained at 85–90° C. Thirty minutes after the addition was complete the emulsion was cooled. The yield of final product was found to be greater than 96%.

Polymerization of methyl methacrylate in intimate mixture with the poly(2-ethylhexyl acrylate) in the manner described above resulted in the formation of a copolymeric product in which poly(methyl methacrylate) chains were attached to the poly(2-ethylhexyl acrylate) "backbone."

Physical properties of the copolymeric product of this invention prepared as noted above differ markedly from those of a physical mixture of homopolymers of the same monomers in the same ratio of 1:1, or of a random copolymer prepared by emulsion polymerization of the monomers in admixture in said same ratio. Some idea of these differences can be gleaned from Table V below:

EXAMPLE 2

One part of sodium lauryl sulfate and 400 parts of water were mixed and heated to 60° C. with stirring under nitrogen. 0.25 part of potassium persulfate was added. One hundred parts of 2-ethylhexyl acrylate was then added all at once and the temperature of the resulting emulsion was adjusted to 60° C. The exothermic polymerization which started in a few minutes caused the temperature to rise to about 76° C. The emulsion temperature was increased to 85° C. by external heating and 100 parts of methyl methacrylate was added gradually over a period of thirty minutes. The temperature of the emulsion was maintained at 85–90° C. during addition of the monomer. Thirty minutes after the addition was completed, the emulsion was cooled. Conversion into the desired product was found to be greater than 96%.

EXAMPLE 3

One hundred parts of 2-ethylhexyl acrylate was polymerized in emulsion by the gradual addition process described in the first part of Example 1. Thirty minutes after the addition was completed, the emulsion was cooled at 60° C. and 100 parts of methyl methacrylate were added all at once. The temperature was adjusted to 60° C. The heat of polymerization caused the temperature to rise to 76° C. Thirty minutes later the emulsion was cooled. Conversion to the desired product was found to be greater than 96%.

EXAMPLE 4

The same procedure was followed as is described in Example 1 above except that 100 parts of n-octyl acrylate were used instead of 2-ethylhexyl acrylate. Analysis of the polymeric product (by liquid-liquid partition) indicated grafting of methyl methacrylate onto the polymeric chain of n-octyl acrylate.

EXAMPLE 5

The same procedure as in Example 1 was followed except that methyl acrylate in the same weight proportions was used instead of 2-ethylhexyl acrylate. During the gradual addition of the methyl acrylate to the solution and thereafter during the addition of the methyl methacrylate the temperature was maintained at 75–80° C. There resulted a graft copolymer of methyl methacrylate onto methyl acrylate. Conversion was in excess of 96%.

EXAMPLE 6

The same procedure as in Example 1 was followed except that ethyl acrylate in the same weight propor-

TABLE V

| Sample | Tensile Strength, p.s.i. (24°C.) | Elongation, percent (24° C.) | Tensile Modulus, p.s.i. (24° C.) | Torsional Modulus, kg./cm.² | | | |
|---|---|---|---|---|---|---|---|
| | | | | 0° C. | 20° C. | 40° C. | 60° C. |
| Graft Copolymer | 500 | 2.1 | 37,200 | 3,000 | 2,500 | 2,200 | 2,100 |
| Random Copolymer | 1,300 | 240 | 9,800 | 4,000 | 600 | 20 | 7 |
| Mixed Homopolymers | 40 | 780 | 1,000 | 500 | 200 | 60 | 40 | tions was used in lieu of 2-ethylhexyl acrylate. There resulted a graft copolymer of methyl methacrylate onto ethyl acrylate. Conversion was in excess of 96%.

Physical properties of the copolymeric product of this invention prepared as noted above differ markedly from those of a physical mixture of homopolymers of the same monomers in the same ratio of 1:1, or of a random copolymer prepared by emulsion polymerization of the monomers in admixture in said same ratio.

EXAMPLE 7

One part of sodium lauryl sulfate and 400 parts of water were mixed and heated to 50° C. with stirring under nitrogen. One hundred parts of 2-ethylhexyl acrylate was added all at once and the temperature adjusted to 50° C. One part of 30% $H_2O_2$ and 0.4 part of sodium sulfoxylate formaldehyde were then added. The polymerization exotherm caused the temperature to rise to 70° C. Thirty minutes later the emulsion was cooled to 50° C. and the 100 parts of methyl methacrylate was added all at once. The polymerization exotherm caused the temperature to rise to 58° C. in one hour. After this peak temperature had been reached, one part of 30% $H_2O_2$ and 0.4 part of sodium sulfoxylate formaldehyde were added. Thirty minutes later the emulsion was cooled. There resulted a polymeric product of methyl methacrylate and 2-ethylhexyl acrylate. Conversion was greater than 96%.

EXAMPLE 8

The same procedure as in Example 1 was followed except that for 100 parts of 2-ethylhexyl acrylate there was substituted a mixture of 10 parts of methyl methacrylate and 100 parts of ethyl acrylate, and for the second component 90 parts of methyl methacrylate rather than 100 parts thereof was used. There resulted a polymeric product of methyl methacrylate and a copolymer of ethyl acrylate and methyl methacrylate.

EXAMPLE 9

The same procedure as in Example 1 was followed except that ethyl methacrylate was substituted for the 100 parts of methyl methacrylate. There resulted a polymeric product of ethyl methacrylate and 2-ethylhexyl acrylate.

EXAMPLE 10

The same procedure as in Example 1 was followed except that for the 100 parts of methyl methacrylate used therein there was substituted a mixture of 10 parts of ethyl acrylate and 90 parts of methyl methacrylate. There resulted a polymeric product of methyl methacrylate, ethyl acrylate and 2-ethylhexyl acrylate.

EXAMPLE 11

The same procedure as in Example 1 was followed except that butyl methacrylate was substituted for methyl methacrylate. There resulted a polymeric product of butyl methacrylate and 2-ethylhexy acrylate.

EXAMPLE 12

One part of sodium lauryl sulfate and 400 parts of water were mixed and heated to 80° C. under nitrogen with stirring. 0.25 part of potassium persulfate was then added. Eighty parts of n-butyl acrylate was then added gradually over a 30-minute period to the solution, which was maintained at 80–90° C. Polymerization of the monomer was virtually complete in a few minutes after the addition. Thirty minutes later 120 parts of methyl methacrylate was added over a period of 30 minutes during which time the temperature of the emulsion was maintained at 85–90° C. Thirty minutes after the addition was complete the emulsion was cooled. The yield of the final product was greater than 96%.

Physical properties of the copolymeric product prepared as noted above differ markedly from those of a physical mixture of homopolymers of the same monomers in the same ratio of 40:60, or of a random copolymer prepared by emulsion polymerization of the monomers in admixture in the same ratios.

EXAMPLE 13

One part of sodium lauryl sulfate and 234 parts of water were mixed and heated to 85° C. under nitrogen with stirring. 0.25 part of potassium persulfate was added and dissolved. One hundred parts of ethyl acrylate was added gradually over a 30-minute period to the solution, maintained at 85–90° C. Thirty minutes later the emulsion was cooled at 30° C. Conversion was 97%. Thirty-three and one half parts of methyl methacrylate, 33.5 parts of water, and 0.09 part of potassium persulfate were added to the emulsion in a bottle under a nitrogen atmosphere. The bottle was closed and tumbled in a water bath at 30° C. for 65 hours. A stable latex was obtained showing greater than 96% conversion.

EXAMPLE 14

One part of sodium lauryl sulfate and 400 parts of water were mixed and heated to 85° C. under nitrogen with stirring. 0.25 part of potassium persulfate was added. Eighty parts of 2-ethylhexyl acrylate was added gradually over a 30-minute period at 85–91° C. Twenty minutes later 120 parts of methyl methacrylate was added over a period of 30 minutes, during which time the emulsion temperature was 85–90° C. Thirty minutes later the emulsion was cooled. Conversion was greater than 96%.

Polymers were isolated from the emulsion prepared in each of the examples above referred to by freeze-coagulation of the emulsion, draining the thawed polymer and drying the polymer at 30–70° C. These isolated polymers were used in blends hereinafter referred to.

Polymers were isolated from the emulsions prepared in accordance with Examples 1 to 7 above by coagulation of the emulsion with calcium chloride solution, followed by washing and drying of the polymer. Such polymers had essentially the same physical properties as those isolated by the freeze-coagulation method.

Polymers were isolated from the emulsions prepared in accordance with Examples 1 to 7 above, by spray-drying the emulsions. Such polymers had essentially the same physical properties as those isolated by the freeze-coagulation method.

The following examples illustrate the preparation of blends typical of those within the scope of this invention. In each of them the vinyl chloride resin which was used was a comparatively high molecular weight polymer, a commercially available homopolymer which has a specific viscosity of about 0.53 as measured in a 0.4% solution in nitrobenzene at 30° C. and an intrinsic viscosity $[\eta]$ dl./g. of 1.11 as measured in cyclohexanone at 30° C. This vinyl chloride resin was chosen because it tends to show in the best possible light the efficacy of any modifier which is blended therewith.

All polymer blends shown in the following tables were prepared by a standard procedure in which 100 parts of combined vinyl chloride polymer and acrylic copolymer are blended with 2.0 parts of tin mercaptide stabilizer. The polymer blends were milled for exactly seven minutes at 350° F., unless otherwise noted, and then compression molded for five minutes at 350° F. and 1800 p.s.i.

The tests in each table pertain to the well-known Izod milled notched method (A.S.T.M. method D–256–47T) for measuring the impact strength of materials. The procedure involves the forming of a test material to a standard size and shape, with a notch cut into the testpiece. When fixed in position on the Izod testing apparatus, with the notch in a prescribed position relative to other parts of the machine, a free-swinging arm is permitted to fall from a fixed starting place. The end of the arm applies a sudden impact force to the upper half of the specimen causing it to break or distort at the radius of the notch, the arm continuing on up its arc a certain distance which is measured on a graduated scale that is in back of the arm along the path of its circular travel. The scale is calibrated to show the foot lbs./in. of energy absorbed by the test sample.

The Izod number for the unmodified polyvinyl chloride is approximately 0.5. Thus, to obtain what may generally be considered appreciable improvement over the unmodified form, at least a value of 1.0 is desired, this being double the value achieved by polyvinyl chloride without any modifier.

In the tables which follow it will be noted that the addition of the acrylic modifier causes improved impact resistance in the polyvinyl chloride. Depending on the modifier used, sometimes more of it will be needed than in other instances before an improvement is obtained. Also to be observed is the fact that in excess of certain levels of modifier the impact resistance drops off. The reason for this is that, as the quantity of the modifier is increased beyond a critical point, it is contributing too much of its own low impact resistance value to the combination with the polyvinyl chloride. As a result, there is lost the synergistic effect which is obtained when the critical ranges of both the modifier and the polyvinyl chloride are present.

TABLE VI

| Composition of Polymer | | Composition of Blend | | Izod Notched Impact Strength |
|---|---|---|---|---|
| First Charge EA | Second Charge MMA | Acrylic Polymer | PVC Resin | |
| 75 | b 25 | 10 | 90 | 1.0 |
| 75 | b 25 | 15 | 85 | 25.8 |
| 75 | b 25 | 20 | 80 | 24.0 |
| 50 | a 50 | a 10 | 90 | 1.0 |
| 50 | a 50 | a 15 | 85 | 1.0 |
| 50 | a 50 | a 20 | 80 | 23.5 |
| 50 | a 50 | a 25 | 75 | 3.8 |
| 50 | a 50 | 30 | 70 | 1.0 | a Polymer as per Example 6.
b Polymer as per Example 13.

TABLE VII

| Composition of Polymer a | | Composition of Blend | | Izod Notched Impact Strength | Heat Distortion Temperature at 264 p.s.i. |
|---|---|---|---|---|---|
| First Charge n-BA | Second Charge MMA | Acrylic Polymer | PVC Resin | | |
| 40 | 60 | 10 | 90 | 2.5 | 72.0 |
| 40 | 60 | 15 | 85 | 24.0 | 69.4 |
| 40 | 60 | 20 | 80 | 22.0 | 71.7 |
| 40 | 60 | 25 | 75 | 12.0 | 71.5 |
| 40 | 60 | 30 | 70 | 1.0 | 70.5 | a Polymer as per Example 12.

TABLE VIII

| Composition of Polymer a | | Composition of Blend | | Izod Notched Impact Strength |
|---|---|---|---|---|
| n-Octyl acrylate | MMA | Acrylic Polymer | PVC Resin | |
| 50 | 50 | 7.5 | 92.5 | 2.0 |
| 50 | 50 | 10 | 90 | 21.0 |
| 50 | 50 | 15 | 85 | 23.8 |
| 50 | 50 | 20 | 80 | 20.0 |
| 50 | 50 | 25 | 75 | 1.0 |
| 50 | 50 | 30 | 70 | 1.0 | a Polymer as per Example 4.

TABLE IX

| Composition of Polymer a | | Composition of Blend | | Izod Notched Impact Strength |
|---|---|---|---|---|
| First Charge EA:MMA | Second Charge MMA | Acrylic Polymer | PVC Resin | |
| 50:5 | 45 | 10 | 90 | 1.0 |
| 50:5 | 45 | 15 | 85 | 20.4 |
| 50:5 | 45 | 20 | 80 | 2.0 |
| 50:5 | 45 | 25 | 75 | 1.0 |
| 50:5 | 45 | 30 | 70 | 1.0 | a Polymer as per Example 8.

TABLE X

| Composition of Polymer a | | Composition of Blend | | Izod Notched Impact Strength |
|---|---|---|---|---|
| First Charge 2-EHA | Second Charge EMA | Acrylic Polymer | PVC Resin | |
| 50 | 50 | 10 | 90 | 1.0 |
| 50 | 50 | 15 | 85 | 15.0 |
| 50 | 50 | 20 | 80 | 24.2 |
| 50 | 50 | 25 | 75 | 20.4 |
| 50 | 50 | 30 | 70 | 15.9 | a Polymer as per Example 9.

TABLE XI

| Composition of Polymer a | | Composition of Blend | | Izod Notched Impact Strength |
|---|---|---|---|---|
| First Charge 2-EHA | Second Charge MMA:EA | Acrylic Polymer | PVC Resin | |
| 50 | 45:5 | 10 | 90 | 1.0 |
| 50 | 45:5 | 15 | 85 | 4.0 |
| 50 | 45:5 | 20 | 80 | 23.0 |
| 50 | 45:5 | 25 | 75 | 4.6 |
| 50 | 45:5 | 30 | 70 | 1.0 | a Polymer as per Example 10.

In making the all-acrylic modifiers used to blend with the polyvinyl chloride resins and the like it is preferred to use the described emulsion polymerization techniques. However, bulk and suspension techniques may also be used to make polymers which are compatible with polyvinyl chloride type resins to furnish improved end products.

We claim:
1. A thermoplastic composition which is relatively free-flowing in the mold under injection molding conditions and provides a tough, weather-resistant molded product having an Izod notch impact strength of at least 1, said composition comprising a blend of (A) about 95 to 60 parts by weight of a member selected from a first class consisting of (1) polyvinyl chloride and (2) copolymers of at least 80% by weight of vinyl chloride with up to 20% by weight of another monovinylidene compound copolymerizable therewith from the class consisting of vinyl acetate, styrene and an alkyl methacrylate having no more than four carbon atoms in the alkyl group, and (B) correspondingly, about 5 to 40 parts by weight of a polymeric product of (I) 60 to 25 parts by weight of a member selected from a second class consisting of (a) methyl methacrylate and (b) mixtures of at least 80% by weight of methyl methacrylate with another monomer which is copolymerizable therewith and which has a single vinylidene group as its sole polymerizably reactive group, the member from said second class having been polymerized in intimate contact with (II) 40 to 75 parts by weight of a member from a third class consisting of (c) polymers of an alkyl acrylate having one to eight carbon atoms in the alkyl group and (d) copolymers of at least 80% by weight of a said alkyl acrylate with another monomer which is copolymerizable therewith and which has a single vinylidene group as its sole polymerizably reactive group, the said single vinylidene groups of (b) and (d) above being members of a fourth class consisting of alkyl acrylic esters, alkyl methacrylic esters, acrylic acid, methacrylic acid, acrylic nitrile, methacrylic nitrile, vinyl halides, vinyl esters, styrene and vinyl toluene.

2. The composition of claim 1 in which the component present in 5 to 40 parts is a polymeric product resulting from polymerizing methyl methacrylate in intimate contact with polymerized ethyl acrylate.

3. The composition of claim 1 in which the component present in 5 to 40 parts is a polymeric product resulting from polymerizing methyl methacrylate in intimate contact with polymerized 2-ethylhexyl acrylate.

4. The composition of claim 1 in which the component present in 5 to 40 parts is a polymeric product resulting from polymerizing methyl methacrylate in intimate contact with polymerized methyl acrylate.

5. The composition of claim 1 in which the component present in 5 to 40 parts is a polymeric product resulting from polymerizing methyl methacrylate in intimate contact with polymerized butyl acrylate.

6. The composition of claim 1 in which the component present in 5 to 40 parts is a polymeric product resulting from polymerizing ethyl methacrylate in intimate contact with polymerized 2-ethylhexyl acrylate.

References Cited by the Examiner

UNITED STATES PATENTS

| | | | |
|---|---|---|---|
| 2,861,060 | 11/1958 | Goode | 260—885 |
| 2,911,398 | 11/1959 | Vandenberg | 260—85.5 |
| 2,926,126 | 2/1960 | Graham et al. | 260—885 |
| 2,943,074 | 6/1960 | Feuer | 260—876 |
| 2,944,037 | 7/1960 | Clark | 260—899 |
| 3,041,309 | 6/1962 | Baer | 260—876 |

FOREIGN PATENTS 220,155    2/1959    Australia.

MURRAY TILLMAN, *Primary Examiner.*

LEON J. BERCOVITZ, SAMUEL H. BLECH,
*Examiners.*